United States Patent [19]

Ruyak et al.

[11] 4,402,715
[45] Sep. 6, 1983

[54] GAS/OIL SEPARATOR

[75] Inventors: Robert F. Ruyak, Erie; Charles W. Smith, Jr., Fairview, both of Pa.

[73] Assignee: Autoclave Engineers, Inc., Erie, Pa.

[21] Appl. No.: 333,649

[22] Filed: Dec. 23, 1981

[51] Int. Cl.³ .................... B01D 50/00; B01D 45/14
[52] U.S. Cl. .................................. 55/317; 55/337; 55/400; 55/426; 55/DIG. 17
[58] Field of Search ............... 55/184, 185, 188, 199, 55/201, 203, 317, 328, 337, 400, 407, 408, 409, 426, DIG. 17, DIG. 25; 415/121 A; 417/420

[56] References Cited

U.S. PATENT DOCUMENTS

| 2,467,408 | 4/1949 | Semon | 55/426 |
| 2,996,363 | 8/1961 | Ruyak | 417/420 |
| 3,205,827 | 9/1965 | Zimmermann | 417/420 |
| 3,626,672 | 12/1971 | Burbidge | 55/185 |
| 4,092,137 | 5/1978 | Howe et al. | 55/185 |
| 4,152,099 | 5/1979 | Bingler | 417/420 |

FOREIGN PATENT DOCUMENTS

| 73657 | 8/1917 | Austria | 55/407 |
| 217439 | 10/1961 | Austria | 55/337 |
| 54-108979 | 8/1979 | Japan | 55/184 |

Primary Examiner—David L. Lacey
Attorney, Agent, or Firm—Webb, Burden, Robinson & Webb

[57] ABSTRACT

A high pressure gas/oil separator comprising a pressure vessel with a magnetically driven hollow shaft extending thereinto. The shaft has a slinger at its lower end within the vessel. The upper end of the shaft is in communication with a source of the gas/oil mixture. The vessel has a purified gas outlet above the slinger. Gas/oil mixture is thrown by centrifugal force against walls of the vessel and the oil coalesces on the walls and drains to the bottom of the vessel. The purified gas escapes from the vessel through the outlet port.

4 Claims, 2 Drawing Figures

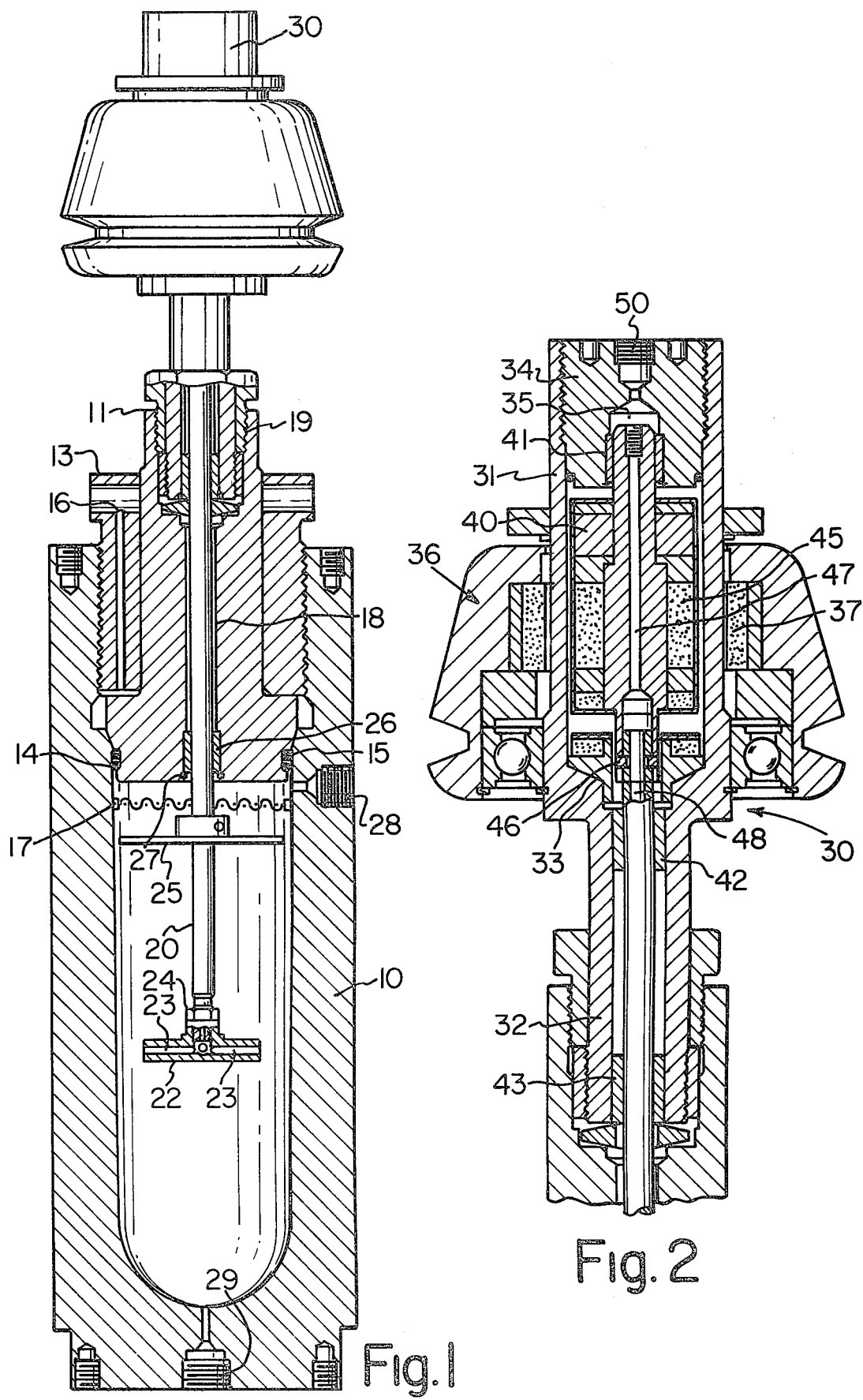

GAS/OIL SEPARATOR

DESCRIPTION

1. Technical Field

It is extremely important to remove all hydrocarbons from gases in certain gas compression systems. An autoclave furnace is a pressure containing vessel that encloses a furnace. Thus, the interior of the furnace may be simultaneously subjected to both high temperatures and high pressures. Autoclave furnaces are used, for example, in hot isostatic pressing where powders encapsulated in a cannister are treated to high temperatures and pressures to cause them to sinter and compact. During the operation of an autoclave furnace for hot isostatic pressing hydrocarbons in the presence of the inert pressurizing gas will adversely affect the metal parts of the autoclave furnace. Improvement in the purity of the gas improves the life of the metal parts. Most piston-type compressors require lubrication in the packing rings which is eventually transferred to the gas being compressed. Some gas compressors have an oil separator chamber that allows the high velocity gas to enter a chamber through a side port and impinge against the inside of the opposite chamber wall and then drain by gravity to the bottom of the chamber where it is accumulated for periodic removal. Some of them have a simple compression cylinder with filter cartridges and/or demister packages. Such devices do not remove all of the oil entrained in the gas and there exists a need for a device to further reduce the oil content of the compressed gas. The device described herein may be placed on the downstream side of a standard compressor separator as just described in which case an additional amount of oil will be removed from the gas.

2. Disclosure of the Invention

The high pressure oil separator according to this invention comprises a pressure vessel, a cover for the vessel having a driven shaft journaled therein and a magnetic drive for the driven shaft. The driven shaft is hollow having a central bore therein. The shaft extends into the pressure vessel and terminates with a slinger device. The cover is provided with a gas/oil inlet port that communicates directly with the bore in the hollow shaft. Near the top of the vessel is an outlet for the deoiled gas. The cover comprises a tubular non-magnetic housing securable at one end to an opening in the autoclave vessel and sealed at the opposite end except for the gas/oil inlet port. In this way, the housing is subject to the vessel pressure.

A drive sleeve or sheave is mounted coaxial with the housing and is rotatably mounted thereto. The drive sleeve supports drive magnets. The driven shaft is journaled in said housing by bushings that have axial slots therein for equalization of pressure. Integral with the driven shaft is a driven magnet assembly supporting driven magnets. When the drive sleeve or sheave is turned the driven shaft follows due to the magnetic coupling.

The gas/oil mixture is introduced through the gas/oil inlet port, passes down through the interior of the driven shaft and upon reaching the slinger is thrown out against the walls of the pressure vessel by centrifugal force. The oil particles hit the side of the vessel, slide down the side under the pull of gravity and accumulate in the bottom of the vessel. Not only is oil removed from the gas stream but also moisture is removed and accumulates with the oil at the bottom of the vessel.

The deoiled gas escapes through an outlet provided near the top of the vessel. At the base of the vessel is an outlet port through which the accumulated oil and water may be drained.

BRIEF DESCRIPTION OF THE DRAWINGS

Further features and other objects and advantages of this invention will become clear from the following detailed discussion made with reference to the drawings in which FIG. 1 is a partial section through a oil separator according to this invention; and FIG. 2 is a detail of the magnetic drive shown in section.

BEST MODE FOR CARRYING OUT THE INVENTION

Referring now to FIG. 1, there is shown a pressure vessel 10 having an elongate up-right axis. The vessel has a cover body 11 which is held in place by main nut 13. The main nut 13 has external threads that engage internal threads in the inner diameter of the vessel 10. The cover body is sealed to the vessel by O-ring 14 and a leather back-up ring 15. The main nut is provided with a vent system 16 that permits detection of a leak in the seal provided by O-ring 14. The cover body 11 has an axial bore 18 and an axial socket 19. Extending downwardly through the axial bore 18 is a driven shaft 20. At the bottom end of the driven shaft is a slinger 22 having radial bores 23. The slinger is fixed to the shaft 20 by jam nut 24. Also fixed to the drive shaft 20 is a splash plate 25. The splash plate is simply a disk that forces the escaping gases to pass through the annular space between the disk and the vessel walls.

According to a preferred embodiment of the invention, the chamber has mounted therein above the splash plate or in lieu of the splash plate, a demister filter 17 comprising a filter presenting little back pressure to the flowing gases but having the ability to gather moisture and oil not previously removed from the gas stream.

The driven shaft is journaled by bearing 26 held in place by retaining ring 27 among other locations. The vessel is provided with a gas outlet 28 near the top of the vessel just below the cover body.

Secured to the cover body 11 in the axial socket 19 is a cylindrical non-magnetic drive housing 30. The drive housing is provided with a structure very similar to that disclosed in U.S. Pat. No. 4,106,825. The drive housing is comprised of two portions; a portion of larger diameter 31 and a portion of smaller diameter 32. Joining the portion of larger and smaller diameter is an annular seat 33. The end of the drive housing 30 has threadably fixed thereto a plug 34. The plug is arranged with a recess 35, the purpose of which will be explained.

Surrounding the larger portion of the drive housing 30 is a drive sheave or sleeve 36 journaled to the housing by ball bearings. The purpose of the drive sleeve or sheave is to carry drive magnets 37 which may be cylindrical magnets of the rare earth cobalt type being circumferentially magnetized. That is, the magnets may have a plurality of alternating north and south poles around the inner periphery thereof. Positioned within the housing is a driven magnet assembly 40. The driven shaft assembly is journaled by bushing 41 in the recess 35 of the plug 34, by bushings 42, 43, in the portion of the housing having a smaller diameter 32. Secured to the driven shaft assembly are driven magnets 45 which may be cylindrical magnets of the rare earth cobalt type, preferably samarium cobalt, which magnets are circumferentially magnetized. In other words, the driven magnets may have a plurality of alternating poles surrounding the outer cylindrical surface thereof. The number of poles is equal to the number of poles in the inner cylindrical surface of the drive magnets and having the same uniform angular spacing.

According to a preferred embodiment of this invention, the magnets secured to the driven magnet assembly or those portions of the driven assembly supporting them, are encapsulated in a non-magnetic can. It should be understood that the bushings 42, 43, and 26 are grooved to allow gases to pass thereby thus providing for equalization of pressure through the housing.

The driven shaft 20 is secured to the driven magnet assembly 40 by pin 46. The driven magnet assembly has a central bore 47 in communication with bore 48 in the driven shaft.

The gas/oil inlet 50 in the plug 34 communicates with the recess 35.

Operation

The oil separator according to this invention operates as follows: The oil/gas or oil/gas/moisture mixture is introduced into the gas inlet 50 in the plug 34 and passes down through the bore 48 in the driven shaft 20 to the slinger 22 where through the impeller action of the slinger it is given a radial velocity of sufficient magnitude to drive the oil and moisture particles contained therein against the side of the vessel. Upon hitting the side of the vessel the oil and moisture particles coalesce and drain to the bottom of the vessel. The purified gas passes out the gas outlet in the side of the vessel having been purified by the removal of oil and moisture. The speed of rotation of the slinger may be adjustable to obtain the optimum results. This may be accomplished by driving the sheave 36 from a variable speed motor.

Having thus described the invention with the detail and particularity required by the Patent Laws, what is desired protected by Letters Patent is set forth in the following claims:

1. An apparatus for separating oil and gas at high pressures comprising:
   a pressure vessel having an open end;
   a cover closing the open end of said pressure vessel, said cover having an elongate non-magnetic hollow extension;
   a hollow driven shaft journaled in said elongate non-magnetic hollow extension, said shaft extending downwardly into the pressure vessel;
   a plug with an inlet opening for an oil/gas mixture fixed in an end of said extension which is positioned in said cover, said opening being in communication with the interior of the hollow shaft;
   impeller means at the end of the hollow shaft within said vessel for throwing the oil/gas mixture against the sides of the vessel so as to separate oil from gas;
   magnetic means for driving the hollow driven shaft in the elongate non-magnetic hollow extension; and
   an outlet port for the purified gas.

2. Apparatus according to claim 1 wherein the magnet means for driving the driven shaft comprises a drive magnet assembly having permanent magnets and being journaled to the exterior of the non-magnetic extension and a driven magnet assembly having permanent magnets fixed to the hollow driven shaft.

3. Apparatus according to claim 1 wherein a splash plate comprising a disk having a diameter less than the inner diameter of the vessel is mounted to the hollow driven shaft above the impeller.

4. Apparatus according to claim 1 wherein a filter is mounted to the vessel above the impeller and below the outlet port separating the vessel into inlet and outlet chambers.

* * * * *